G. MOORE.
FILTERING PROCESS.
APPLICATION FILED JAN. 17, 1908.

955,836.

Patented Apr. 19, 1910.
2 SHEETS—SHEET 1.

WITNESSES:
C. H. Fesler
Susan Klink

INVENTOR
George Moore,
By Edgar M. Kitchin
his Attorney.

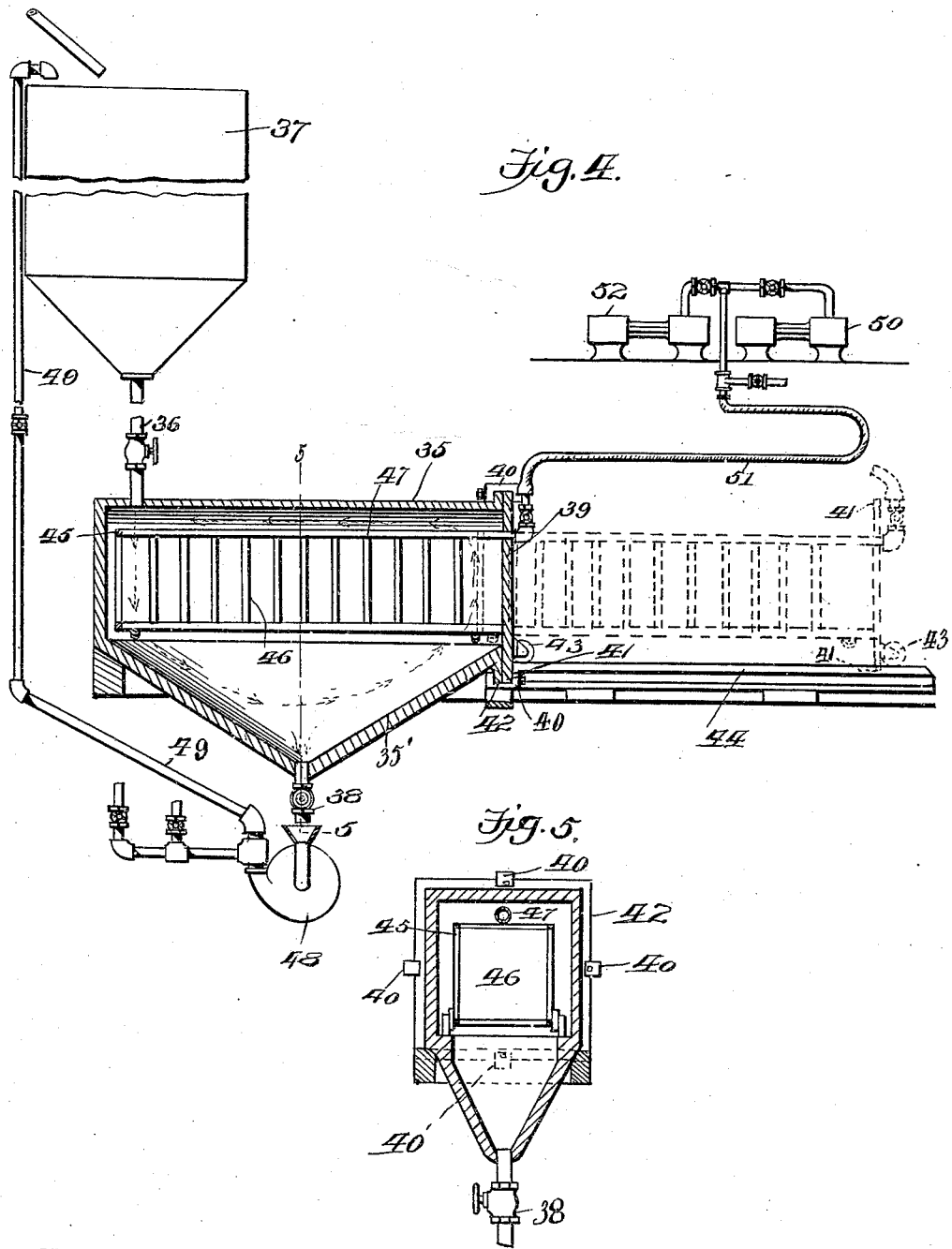

UNITED STATES PATENT OFFICE.

GEORGE MOORE, OF JOPLIN, MISSOURI.

FILTERING PROCESS.

955,836.  Specification of Letters Patent.  Patented Apr. 19, 1910.

Original application filed February 20, 1904, Serial No. 194,585. Divided and this application filed January 17, 1908. Serial No. 411,286.

*To all whom it may concern:*

Be it known that I, GEORGE MOORE, a citizen of the United States, residing at Joplin, in the county of Jasper and State of Missouri, have invented certain new and useful Improvements in Filtering Processes; and I do hereby declare the following to be a full, clear, and exact description of the invention, such as will enable others skilled in the art to which it appertains to make and use the same.

This invention relates to improvements in the process of filtering slimes or metal bearing pulp, now generally known as the Moore process which is the subject of my Patent No. 764,486, dated July 5, 1904.

Figure 1:
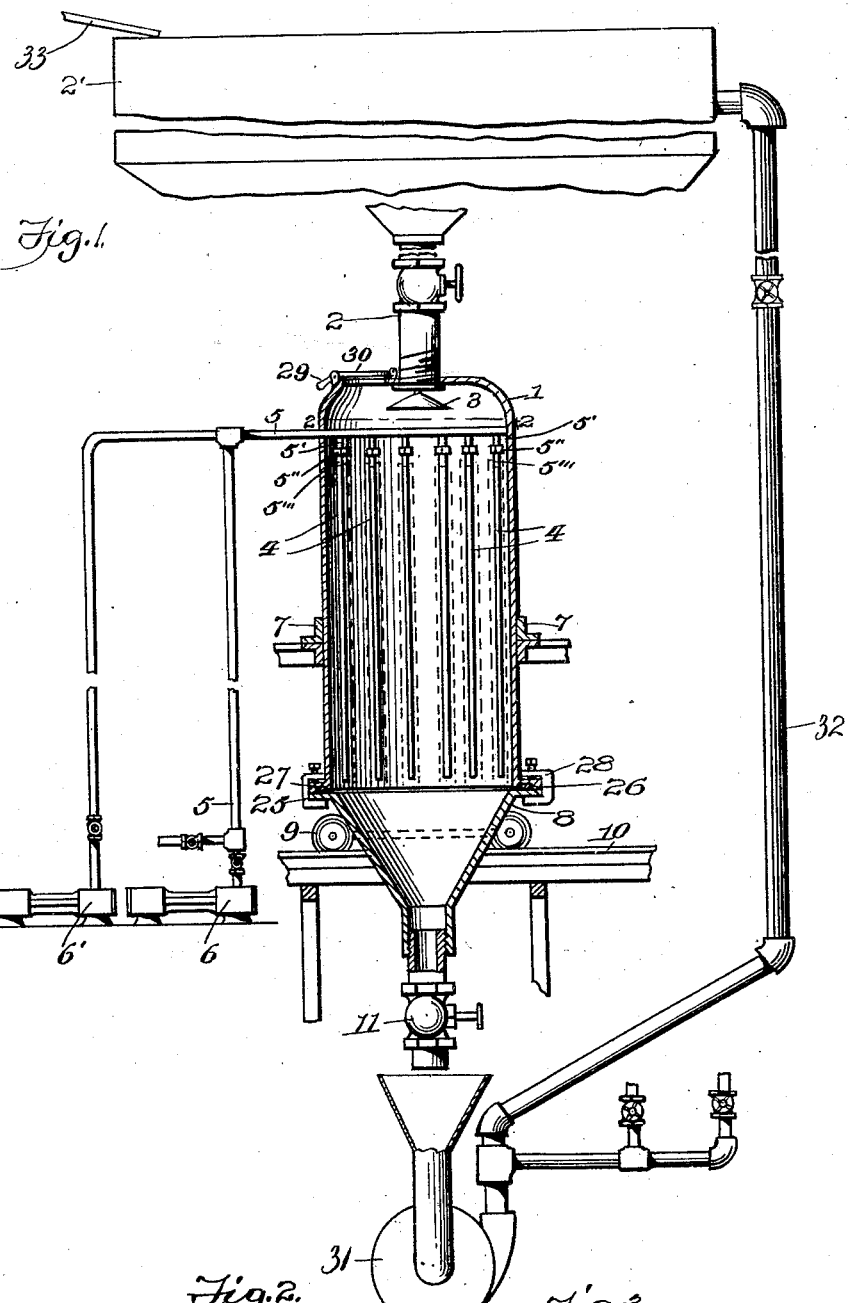
Figure 2:
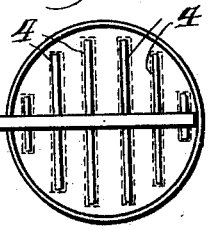
Figure 3:
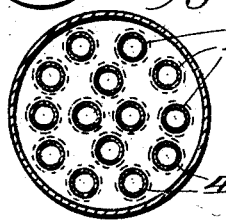

In the accompanying drawings: Figure 1 is a longitudinal, vertical, central section through a filter embodying elements adapted for efficiently carrying out the present improved process. Fig. 2 is a horizontal, transverse section thereof taken on the plane indicated by line 2, 2 of Fig. 1, and looking downwardly. Fig. 3 is a similar view of a modified form of structure. Fig. 4 is a longitudinal, vertical, central section through a further modification. Fig. 5 is a transverse section therethrough taken on the plane indicated by line 5, 5 of Fig. 4.

While the present improved process may be carried out by the employment of various apparatus, I have illustrated in Figs. 1 and 2 a structure well adapted for the practicing of the process, and in order to facilitate setting forth the steps of the process the said structure will be described in detail.

Referring to the drawing by numerals, 1 indicates a pressure chamber which is provided, at its upper end, with a supply pipe 2 having a suitable spreader 3 positioned beneath the discharge end of said pipe. Suitably supported within the chamber 1 are filtering plates or cells 4, 4 spaced apart and arranged to cover as great an area within said chamber as practicable. Each of the plates or cells 4 may be made up in any preferred manner so as to present a filtering surface with an interior space communicating with a common discharge tube 5, which in turn communicates with any suitable pump 6 designed for effecting a drawing action through said tube during a part of the operation, and with pump 6' for passing a reverse current through said filter during the discharge of the solids collected thereon, as will hereinafter fully appear.

The chamber 1 is mounted upon any suitable, fixed brackets, 7, 7 and retained by the same in a given position. A preferably funnel-shaped head 8 having an annular, outwardly extending flange 25, normally closes the lower end of the chamber 1, said chamber 1 being formed at its lower end with a similar flange 26, and said head rests upon any suitable carriage 9 positioned to travel upon tracks 10, said head being arranged to slide beneath the lower end of said chamber 1, and being free to move from beneath the same whenever desired. A suitable, annular packing or gasket 27 is preferably carried by the flange 26, and said flanges 25 and 26 are adapted, when the parts are in the position indicated in Fig. 1, to be locked together by means of the clamps 28. The lower end of the tapered or funnel-shaped head 8 is provided with any suitable controlling valve 11 for preventing the discharge of the materials within the chamber when desired.

As will be observed by reference to Fig. 3, the plates 4 may be substituted by tubular filters 4' in any suitable number and arranged for facilitating the drawing of material through the filtering medium carried by said tubes.

In carrying out the present process, the metal bearing pulp is introduced under pressure through the pipe 2 from pressure tank 2' into the chamber 1, such pressure being sufficient for forcing the liquids from said pulp through filter plates 4 or tubes 4', until the said plates or tubes, as the case may be, become coated with solids, as indicated in dotted lines in the drawing, said coating never being permitted to become thick enough to entirely close the spaces between the several plates, or between the plates or tubes and the contiguous walls of the chamber 1. At this point, the surplus pulp that is the remaining free pulp is allowed to flow out through valve 11, the vacuum pump being brought into operation for holding the slime cakes in position on the filter surfaces, and a dissolving fluid, such as barren solution, is introduced through the pipe 2, followed by a cleansing fluid, as water, and the vacuum pump 6 continues its operation until the desired amount of such fluids is drawn through the solids and the filtering medium, and out through pipe 5, the said fluids being introduced under such head of pressure if desired, as to be forced through the filters independently of action of pump 6. This operation may be continued with either or both of said fluids until the solids being treated have been impoverished to the desired degree, the valve 11 being opened for permitting the excess liquids within the chamber 1 to escape at the close of each operation, and said valve being closed for the next operation, that is, the remaining free barren solution is permitted to escape through valve 11 after the completion of the operation of displacement of values from the cakes on the filter cells 4 by barren solution, and then the displacement by water is carried out and the excess of water is allowed to escape through valve 11, the cakes being all of the time held, as above stated, on the filter cells by the action of pump 6. The drawing action through pipe 5 is continued during the escape of the liquid through the valve 11, and also while head 8 is being moved along the track 10. As soon as head 8 has been removed from beneath chamber 1, the pumping action is stopped, and air is permitted to enter the filter plates 4 through the pipe 5 either under pressure or not, as may be desired. If desired, air is introduced under pressure from pump 6', and the solids will fall from the filtering medium into any suitable receptacle below. However, it is not absolutely necessary that the air introduced should be under pressure, for the reason that the weight of the solids clinging to the filtering medium is usually sufficient to cause such solids to drop from the filters when released by the admission of atmosphere and the consequent relief of vacuum within the filters. After the solids have been discharged, the head is returned to its former position, and the complete cycle of operations may be repeated. By this process I am enabled to remove all, or substantially all, of the precious metals dissolved from slimes in the most expeditious manner while facilitating the disposition of the solids after their cleansing.

While carrying out the process, as above set forth, it is found that, unless some means are provided to prevent clogging of the heavier substances within the bottom head 8, the settling of sands, during one operation will be sufficient for filling such bottom and closing up the spaces between the plates 4 at their lower ends, and, in order to prevent such clogging, I contemplate leaving the valve 11 slightly open during the building up of cakes or coatings of solids on the filter plates, not, however, to a sufficient extent for relieving the pressure within the chamber 1, whereby the settled portion of solids will be removed as the same descend into the bottom 8. Of course, the portions that are discharged in this manner through valve 11 may be returned to the original source of supply for further treatment. That is to say, the discharged slimes may be directed back to chamber 1 by any suitable conveyer, as by a return pipe 32 extending from below the valve 11 up to the supply tank 2' provided with any suitable apparatus, as the pump 31', for lifting the slimes through the pipe. The dissolving and cleansing fluids drained through valve 11 may, of course, be disposed of in any suitable or preferred manner, as by being passed through a suitable branch or branches of said return pipe. A supply pipe 33 communicates with tank 2' and leads from any suitable source of supply not illustrated.

From the foregoing and from the disclosure in the drawing, it will be observed that the movement of the liquids into the interior of the filter plates occurs as a result of a difference in pressure between the exterior and interior of the filter plates, and this difference in pressure obviously may be created and maintained by the supplying of the material to be filtered under pressure through the pipe 2 or by any other suitable method as desired.

Regardless of how the difference in pressure which produces the filtration is maintained, it is to be noted that the influx of material through pipe 2 (which is permitted by the maintenance of the valve 11 in a partially open condition, and by the discharge through pipe 5,) and its discharge over the spreader 3 creates movement which prevents stratifying of the solids and insures substantially uniform consistency of the body of the pulp. Thus the coatings or cakes of solids on the several filter plates 4 will be built up of substantially uniform resistance to the action resulting from the difference in pressure between the interior and exterior of the filter plates. The movement of the free pulp (and by "free pulp" is meant the fluid emulsion as distinguished from the cakes of solids adhering to the filter cells) is obviously comparatively gentle and is not allowed to become sufficiently violent to wear away or otherwise affect the structural formation of the cakes of solids on the filter cells. It is to be noted, of course, that the dissolving fluid is introduced after the removal of the free pulp, and the washing fluid is introduced after the removal of the free dissolving fluid.

In order to facilitate the removal of plates 4 from within the chamber 1, I preferably connect said plates with the pipe 5 by means of nipples 5', 5' and unions 5'' connecting said nipples with pipes 5''' engaging the plates 4. An entrance opening 29 is preferably formed in the upper end of the chamber 1 and normally closed by a suitable cap 30. Thus it will be seen that, when the plates 4 become worn or broken or, for any other reason, it becomes desirable to remove the same, it is only necessary to rotate the unions 5″ sufficiently for unscrewing their connections with pipes 5‴, and said plates are free to be removed.

If in carrying out the present improved process with heavier pulp or slimes, it is found that the degree of movement of the pulp in the chamber 1 is not as high as may be desired, an increased amount of movement may be secured by the employment of a slightly modified form of apparatus such as is illustrated in Figs. 4 and 5, in which 35 is a filter chamber adapted to be supplied with pulp to be filtered by a valved pipe 36 extending from a supply tank 37, the pulp delivered through the pipe 36 being supplied under pressure. The bottom 35′ of the chamber 35 is conical or tapering to a suitably valved discharge tube 38. The supply pipe 36 is arranged at one end or side of the chamber 35 so that the incoming pulp will produce a circulatory movement of the contents of the chamber somewhat after the manner indicated by the arrows owing to the entrance of the pulp at one side of the circulating mass. A removable head 39 is provided for the chamber 35 and during operation is clamped in position by any suitable clamps 40 applied to the flanges 41 and 42 of the head 39 and open end of the chamber 35 respectively. The head 39 is supported by carrying wheels 43 running on tracks 44 which extend forwardly from and parallel to the longitudinal axis of the chamber 35. Fixed to the head 39, and in operation extending within the chamber 35, is a filter frame 45 supporting a number of filter plates 46 constructed similarly to plates 4. Obviously tubular filter cells, such as are seen at 4′, may be utilized instead of the plate 46. The frame 45 is mounted on carrying rollers arranged on tracks or ways within the chamber 35 parallel to the longitudinal axis thereof, and each of the filter plates 46 communicates with a common discharge pipe 47, which pipe is connected by a flexible pipe 51 with any suitable vacuum and blast pumps 50 and 52, similar to pumps 6 and 6′, respectively.

The process is carried out in conjunction with the chamber 35 and connected parts exactly as described above, the disposition of the solid coatings from the filter cells being accomplished in a slightly different manner, that is by withdrawing the cells from the inclosing chamber after a complete filtering operation and discharging the solids, instead of withdrawing the bottom of the chamber. The preferred form of practicing the process while using the chamber 35 and surrounding parts consists in the introduction of the pulp into the chamber while the filter frame and filter plates are disposed therein, and the head 39 is clamped in position, the pulp being supplied under sufficient pressure for forcing the liquid therefrom through the filtering medium and out through a common discharge pipe 47 until cakes or coatings of requisite character are built up on the filter cells, the building up being approximately uniform owing to the movement occurring within the chamber 35, due to the influx of pulp and discharge of liquid. Of course, some of the heavier solids will settle down into the pipe 38, and as the valve in said pipe 38 is left slightly open (not, however, to an extent sufficient for relieving the pressure in the chamber 35) the settlings will descend into a return pump 48 and be returned thereby through a pipe 49 to the original source of supply, that is to the pulp supply tank 37 or after the manner suggested by the return pipe in Fig. 1. The branch pipes and the main portion of the return pipe 49 may, of course, be suitably valved for controlling the return as desired. After the cakes on the filter plates 46 have been built up to the extent desired, the supply of pulp through the pipe 36 is cut off and the valve in the pipe 38 opened for draining the free pulp from chamber 35, the vacuum pump 50, which communicates with pipe 47, operating during this draining to prevent dropping of the cakes of solids from the filter plates 46, and the said vacuum pump continues its operation after the valve in pipe 38 has been closed and while dissolving fluid or barren solution is being introduced through the pipe 36, as for instance, from a branch pipe not illustrated leading from any suitable source of supply. After the dissolving fluid has been introduced and the requisite quantity thereof passed through the cakes of solids on the filter plates for removing the remaining values therefrom, (the passage of the dissolving fluid through such cakes being in the nature of a uniform advance through the cakes owing to the evenness of resistance to such advance by reason of the form in which the cakes have been built up,) the chamber 35 is drained of the free dissolving fluid through pipe 38, which fluid may be returned to its source of supply by the return pump 48 through a suitable valved branch of pipe 49. Of course, during the draining of the dissolving fluid from the chamber 35 the vacuum pump 50 continues its operation, having been employed if desired for aiding in the maintenance of the difference in pressure between the exterior and interior of the filter plates 47, it being obvious of course that the said vacuum pump may be utilized at any time for this purpose during the practicing of the present invention. As soon as the chamber 35 has been drained of the free dissolving fluid, a charge of cleansing fluid is introduced through the pipe 36, as for instance, from a suitably valved branch of said pipe not illustrated, and the cleansing fluid is then passed through the cakes of solids on the filter plates 46 in exactly the same manner as described with respect to the dissolving fluid, the cleansing fluid taking the place of the dissolving fluid in the solids as did the dissolving fluid take the place of the metal bearing liquid in the solids. After the solids have been thoroughly washed and all of the dissolving fluid removed by the penetration of the solids by the cleansing fluid, the supply of cleansing fluid is cut off and the free fluid is drained through pipe 38, and returned by the return pump 48 to the original source of supply of such cleansing fluid, as by means of a suitably valved branch of the return pipe 49, the vacuum pump 50 being operated during the cleansing operation for aiding in the maintenance of the difference in pressure between the interior and exterior of the filter plates, and continuing its operation as the chamber 35 is drained of the free cleansing fluid for retaining the cakes of solids on the filter plates. The vacuum pump 50 continues its operation while the clamps 40 are removed and the frame 45 moved outwardly to the position indicated in dotted lines, whereupon air is admitted through pipe 47 and connections to the interior of the filter plates. Ordinarily, the weight of the cakes of solids on the filter plates is sufficient for causing them to drop from the plates, but when desired a reverse, cleansing current may be passed through the pipe 47 and connections to the interior of the filter plates and outwardly through the filtering medium thereof for dislodging the cakes by operation of a blast pump 52. The frame 47 may then be returned to the interior of chamber 35, and the process repeated.

It is to be observed that the discharge of filtered fluid through the pipe 5 and the drain of pulp through the valve 11 accompanied by the constant influx of pulp through pipe 2 under pressure will maintain such a continuous movement of the pulp within the chamber 1 as will prevent any large amount of settling or stratification of the body of the pulp. For example, in a structure such as seen in Fig. 4, the incoming pulp enters at one side of the mass of pulp in the chamber, and the natural result will be a descent of the incoming pulp, then a lateral movement thereof, and finally an upward movement at the opposite end of the chamber from the point of intake, as indicated by the arrows. This circulation and movement performs the obvious and very valuable function of maintaining the light particles of solids of which the body of the pulp is composed in a state of substantially uniform suspension, so that the cakes of solids built up on the filter surfaces will assume a form which will offer a substantially uniform resistance to the passage of fluid through the cakes and filtering medium, and will thus cause a substantially uniform advance of the inflowing fluid throughout all parts of the cakes.

It is to be noted that during the operation of filtration, the pulp which passes down through the filtering chamber, while moving past the filter cells, will deliver to the surface of the cells certain portions of the solids constituting the body of the pulp, and it is obvious that if certain areas of the pulp contain a relatively less amount of solids than other areas of pulp within the chamber, the liquid will flow more readily from such lighter areas of the pulp through the walls of the filters, and thus build up a resistance as rapidly at the points contiguous to such lighter portions of the pulp as at other points of the filter cells, so that the sluggish movement of the heavier solids and rapid movement of the more flocculent solids will insure a building of a cake on each of the filter cells having a substantially even resistance to the inflow therethrough of the displacing or washing solutions.

It is the common practice of various mills to provide a container for a general supply of cyanid solution from which may be drawn off, from time to time, sufficient quantities for dissolving purposes or for other uses, and as such solution, while in the general supply container, is maintained practically free from precious metals in solution, this supply is customarily referred to as "mill solution" or "barren solution". It is of course well understood by those skilled in this art that after the dissolving of precious metals by a quantity of the barren solution, or any other use made of the same, the metals in solution are first thrown down or the solution otherwise treated for returning it to its barren condition before it is returned to the general supply container. Obviously, in practicing the present invention, water may be used for displacing from the cakes of solids the valuable substances in solution therein, but if more water must be passed into a particular cake for displacing values therefrom than exactly corresponds with the amount of moisture contained by the cake before the entrance of the water, that amount of water delivered to the cake for displacement purposes which is in excess of the moisture formerly contained by the cake will pass on through the cake and, being treated with the mill solution for throwing down metals in solution, will become mixed with the barren solution and will correspondingly weaken and increase the bulk of the barren solution, with the result that larger and larger quantities of barren solution will have to be handled, or some of the barren solution be wasted. Such additions of water to the barren solution is also objectionable as constantly varying the otherwise standard strength of the solution. Hence, it is frequently desirable, in order to insure a complete displacement of values from a cake without the objectionable weakening of the barren solution, to first employ a quantity of barren solution, as above suggested, for displacement of dissolved metal values from the cake, and then to employ only a sufficient quantity of water to, as nearly as practicable, exactly displace and take the place of the barren solution, whereby the barren solution is removed from the cake and, after treatment, may be returned to the general supply of barren solution without appreciably altering the bulk or quality thereof. In this way, it will also be noted, substantially all the remaining moisture in the cake is water. It is, however, entirely within the spirit and scope of the present invention to displace with water alone or barren solution alone if desired, but the most economical and satisfactory method is that just stated. This barren solution or mill solution is referred to herein indifferently as the dissolving solution or cyanid solution, but is employed more as a matter of economy of operation than as a dissolving agent.

This application is a division of my original application No. 194,585, filed Feb. 20, 1904, for patent for improvements in filters, made in compliance with the rules of the Patent Office and as specifically required by the office in the course of acting upon the said original application.

What I claim is:—

1. In a process of the class specified, passing liquid from pulp through filtering medium by a difference in pressure between the side of the medium exposed to the pulp and the opposite side of the medium while free pulp is maintained in motion, and then displacing values from the solids collected on the filtering medium.

2. In a process of the class specified, passing liquid from pulp through filtering medium by a difference in pressure between the side of the medium exposed to the pulp and the opposite side thereof while maintaining free pulp in movement, and thus building up a cake of solids on the filtering medium, and then passing a current through the cake of solids for removing values therefrom.

3. In a process of the class specified, building up a cake of solids on filtering medium by passing liquid from pulp through the medium by a difference in pressure between the side of the medium exposed to the pulp and the opposite side thereof while maintaining free pulp in movement, passing a dissolving fluid through the cake of solids and through the medium by a continuation of the difference in pressure and afterward passing a cleansing fluid through said cake and filtering medium by a further continuance of such difference in pressure.

4. In a process of the class specified, building up a cake of solids on filtering medium by passing the liquid from pulp through the medium by a difference in the pressure at the side of the medium exposed to the pulp from that of the other side of the medium while maintaining free pulp in substantially continuous movement, and then passing a dissolving fluid through the cake thus built up and through the filtering medium with a substantially uniform advance by the continuance of the difference in pressure.

5. In a process of the class specified, building up a cake of solids on filtering medium from pulp by passing liquid from pulp through the medium by means of a difference in pressure at the side of the medium exposed to the pulp from the other side thereof while free pulp is maintained in movement, passing a dissolving fluid through the cake thus built up and through the filtering medium with a substantially uniform advance by the continuance of the difference in pressure, and then passing a cleansing fluid through the cake and filtering medium with a substantially uniform advance by the further maintenance of the difference in pressure.

6. In a process of the class specified, drawing liquid from pulp in a container through a filtering medium by a difference in the pressure at the side of the filtering medium exposed to the pulp from the opposite side thereof while permitting the escape of pulp from the container below the filtering medium and delivering pulp to said container above the filtering medium, and subsequently displacing values from the solids collected on the filtering medium.

7. In a process of the class specified, filtering off the liquid from pulp by difference in pressure between the side of the filtering medium exposed to the pulp and the opposite side thereof, and simultaneously moving free pulp, and subsequently displacing values from solids collected on the filtering medium.

8. In a process of the class specified, passing the liquid from pulp through a filtering medium by maintaining a difference in pressure between the side of the filtering medium exposed to the pulp and the opposite side thereof while maintaining a current of pulp moving past the filtering medium, and subsequently displacing values from the matter collected on the filtering medium.

9. In a process of the class specified, passing the liquid from pulp through a filtering medium by a difference in pressure between the side of the medium exposed to the pulp and the opposite side thereof while moving free pulp contiguous to the medium, and subsequently displacing values from the matter collected on the filtering medium.

10. In a process of the class specified, removing the liquid from pulp by passing the liquid through a filtering medium by a difference in pressure between the side of the filtering medium exposed to the pulp and the opposite side thereof, while moving free pulp and thus building up a cake of solids on the filtering medium, and passing a cleansing fluid through said cake of solids and filtering medium by a continuance of said difference in pressure.

11. In a process of the class specified, removing liquid from pulp by passing the liquid through a filtering medium by a difference in pressure between the side of the filtering medium exposed to the pulp and the opposite side thereof while moving free pulp, and thus building up a cake of solids on the filtering medium, passing a dissolving fluid through said cake of solids and filtering medium by a continuance of said difference in pressure, and then passing a cleansing fluid through said solids and filtering medium by a further continuance of said difference in pressure.

12. In a process of the class specified, passing the liquid from pulp through a filtering medium by pressure exerted on the pulp, while maintaining free pulp from above the pulp in substantially uniform movement, and subsequently displacing values from the matter collected on the filtering medium.

13. In a process of the class described, passing the liquid from pulp through a filtering medium while maintaining free pulp in substantially uniform movement, and subsequently displacing values from the matter collected on the filtering medium.

14. In a process of the class specified, passing liquid from pulp through a filtering medium while maintaining free pulp in substantially uniform movement and thus building up cakes of solids on the filtering medium and subsequently displacing values from the cakes of solids while on the filtering medium and while maintained in the cake form.

15. An improved process of filtering slimes, which consists in filtering off the liquid from the pulp by difference in pressure in a tank containing filter cells, and simultaneously moving free pulp between the cells, substantially as specified.

16. In a process of the class described, filtering off liquid from pulp through a filtering medium by difference in pressure between the side of the medium exposed to the pulp and the opposite side thereof while the filtering medium is maintained submerged in the pulp, and while simultaneously moving free pulp contiguous to the filtering medium, separating the filtering medium and the matter collected thereon from the remaining free pulp, subjecting such matter collected on the filtering medium to the values displacing action of a displacing agent, and maintaining the said matter on the filtering medium during the interim between the separation of the medium and the free pulp and the application of the displacing agent and during the action of the displacing agent.

17. In a process of the class specified, filtering off liquid from pulp by difference in pressure in a tank containing filter cells, simultaneously moving the free pulp disposed between the cells, and subsequently displacing values from the solids collected on the filter cells.

18. In a process of the class described, supplying pulp to a tank, filtering off through filtering medium liquid from the pulp by difference in pressure and thus building up a cake of solids on the filtering medium, maintaining free pulp in motion during the building of the cake while at the same time leaving the solid deposits constituting the cake substantially unaffected further than the building up process, separating the free pulp from the filtering medium and cake thereon, recovering values from said cake, and subjecting the remaining free pulp to further filtration.

19. In a process of the class specified, passing liquid from pulp through filtering medium within a closed chamber and thus building a cake of solids on the filtering medium, moving free pulp during the building of the cake while leaving the solid deposits constituting the cake substantially unaffected further than the building up process, and subsequently recovering values from the cake.

20. In a process of the class specified, passing liquid from pulp through filtering medium within a closed chamber by pressure exerted on the exterior of the filtering medium, moving free pulp within the chamber substantially without affecting the solids constituting the cake further than the building up process, and subsequently displacing values from the cake of solids.

21. In a process of the class specified, passing liquid from pulp through filtering medium within a closed chamber by difference of pressure between the face of the medium exposed to the pulp and the opposite face thereof, moving free pulp during the building up of the cake while leaving the solids constituting the cake substantially unaffected further than the building up process, and subsequently recovering values from the cake.

22. In a process of the class specified, immersing a filter cell in pulp, passing liquid from said pulp by difference of pressure to the interior of said filter cell and thus depositing a cake of solids on the exterior of the filter cells while simultaneously moving free pulp during the depositing operation, and subsequently passing a displacing current through the cake deposited on the filter cell by difference in pressure.

23. In a filtering process, bringing a filtering medium adapted to separate liquid from solids of pulp and pulp into filtering relation, passing liquid from the pulp through the filtering medium, building a cake of solids on such medium, moving free pulp in contact with such cake during the building of the cake, while at the same time leaving the solid deposits constituting the cake substantially unaffected further than the building up process, and subsequently displacing values from the cake.

24. In a filtering process, bringing a filtering medium adapted to separate liquid from solids of pulp and pulp into filtering relation, passing liquid from the pulp through the filtering medium and thus building a cake of solids on such medium, while moving free pulp in contact with such cake during the building of the cake while at the same time leaving the solid deposits constituting the cake substantially unaffected further than the building up process, subsequently exposing a surface of the cake of solids to a displacing agent, and then passing a displacing agent through the cake of solids.

25. In a filtering process, bringing a filtering medium adapted to separate liquid from solids of pulp and pulp into filtering relation, passing liquid from the pulp through the filtering medium and thus building a cake of solids on such medium, while moving free pulp in contact with such cake during the building of the cake while at the same time leaving the solid deposits constituting the cake substantially unaffected further than the building up process, subsequently exposing a surface of the cake of solids to a displacing agent, and passing a displacing agent through the cake of solids approaching from the exposed surface of the cake, and passing toward the filtering medium while the cake is retained on the filtering medium.

26. In a filtering process, bringing a filtering medium adapted to separate liquid from solids of pulp and pulp into filtering relation, passing liquids from the pulp through the filtering medium and building up a cake of solids on such medium, moving free pulp in contact with such cake during the building of the cake while at the same time leaving the solid deposits constituting the cake substantially unaffected further than the building up process, subsequently separating the free pulp from the filtering medium and cake thereon, and then passing a displacing current through the cake.

27. In a filtering process, submerging filtering medium in pulp, passing liquid from the pulp through the filtering medium and building up a cake of solids on the filtering medium, moving free pulp while in filtering relation to the filtering medium during the building up of the solids while leaving the solid deposits constituting said cake substantially unaffected further than the building up process, and subsequently recovering values from the cake of solids.

28. In a filtering process, submerging a plurality of filtering medium with pulp within a chamber, leaving spaces between the filtering mediums in open communication with each other, maintaining a difference in pressure between the side of the filtering mediums exposed to the pulp and the opposite side thereof for causing liquid from the pulp to pass through the filtering mediums and build a cake of solids on each of said mediums, moving free pulp within the chamber during such passing of the liquid while leaving the solid deposits constituting the cakes substantially unaffected, further than the building up process, separating the filtering mediums and free pulp, and subsequently passing a displacing fluid through said cakes and filtering mediums by a continuation of the difference in pressure.

29. In a process of the class specified, submerging filtering medium in pulp, passing liquid from the pulp through the filtering medium by difference in pressure between the side of the filtering medium exposed to the pulp and the opposite side thereof while maintaining free pulp in motion, and then submerging the filtering medium in a cleansing bath and passing liquid of such bath through the filtering medium by a continued maintenance of the said difference in pressure.

30. In a process of the class specified, submerging filtering medium in pulp, passing liquid from said pulp through the filtering medium by a difference in pressure between the side of the filtering medium exposed to the pulp and the opposite side thereof while maintaining free pulp in motion, then submerging the filtering medium in a dissolving bath and passing fluid of said bath through the filtering medium by a continued maintenance of the said difference in pressure.

31. In a process of the class specified, submerging filtering medium in pulp, passing liquid from the pulp through the filtering medium by a difference in pressure between the side of the filtering medium exposed to the pulp and the opposite side thereof while maintaining free pulp in motion, then submerging the filtering medium in a bath of dissolving fluid, passing fluid of such bath through the filtering medium by maintenance of the said difference in pressure, then submerging the filtering medium in a cleansing bath, and passing fluid of said cleansing bath through the filtering medium by a continued maintenance of the difference in pressure.

32. In a process of the class described, submerging filtering medium in pulp, passing liquid from the pulp through the filtering medium by a difference in pressure on the side of the medium exposed to the pulp from the opposite side thereof while maintaining free pulp in movement, and thus building up a cake of solids on the filtering medium, separating the filtering medium and the free pulp, submerging the filtering medium in a cleansing bath while retaining the cake of solids on the filtering medium, and passing fluid of the cleansing bath through the said cake and filtering medium by a continued maintenance of the said difference in pressure.

33. In a process of the class specified, submerging filtering medium in pulp, passing liquid from said pulp through the filtering medium by a difference in pressure between the side of the filtering medium exposed to the pulp and the opposite side thereof, while maintaining free pulp in movement, and thus building up a cake of solids on the filtering medium, separating the filtering medium and the free pulp, submerging the filtering medium in a dissolving bath, and passing fluid of said dissolving bath through said cake and filtering medium by a continued maintenance of the said difference in pressure.

34. In a process of the class specified, submerging filtering medium in pulp, passing liquid from the pulp through the filtering medium by a difference in pressure on the side of the filtering medium exposed to the pulp from the opposite side thereof, while maintaining free pulp in movement, and thus building up a cake of solids on the filtering medium, separating the filtering medium and the free pulp, submerging the filtering medium in a dissolving bath while maintaining the cake of solids on the filtering medium, passing liquid of the dissolving bath through the cake and filtering medium, by a continuance of the difference in pressure, withdrawing the free dissolving fluid and submerging the filtering medium in a bath of cleansing fluid while retaining the cake of solids on the filtering medium, and passing fluid from said cleansing bath through said cake and filtering medium by a continued maintenance of the said difference in pressure.

35. In a process of the class specified, submerging filtering medium in pulp, passing liquid from the pulp through the filtering medium by a difference in pressure on the side of the medium exposed to the pulp from the opposite side thereof while maintaining free pulp in movement, and thus building up a cake of solids on the filtering medium, separating the filtering medium and the free pulp, submerging the filtering medium in a cleansing bath while retaining the cake of solids on the filtering medium, passing fluid of the cleansing bath through the said cake and filtering medium by a continued maintenance of the said difference in pressure, and passing a reverse current through the filtering medium and cake.

36. In a process of the class specified, filtering off liquid from pulp by difference in pressure in a tank containing filter cells, maintaining free pulp in motion during the filtering off of the liquid, and subsequently displacing values from the solids collected on the filter cells.

37. In a process of the class specified, submerging filtering medium in pulp, passing liquid from such pulp through the filtering medium while maintaining the medium submerged in the pulp and maintaining fluid portions of the pulp in motion and subsequently recovering values from the deposits on the filtering medium.

38. In a process of the class described, passing liquid from pulp through a filtering medium submerged in such pulp while maintaining fluid portions of the pulp in motion, and subsequently recovering values from the deposits on said medium.

39. In a process of the class specified, successively submerging filtering medium in pulp and in a displacing agent, passing liquid from the pulp through the filtering medium while the medium is submerged in the pulp, and simultaneously maintaining free pulp in motion, and passing displacing agent through the deposits on the filtering medium and through the filtering medium while the filtering medium is submerged in the displacing agent.

40. In a process of the class described, passing liquid from pulp through a filtering medium submerged in a body of the pulp in a container while maintaining fluid portions of the pulp in motion, and subsequently displacing values from the deposits on the filtering medium.

41. In a filtering process, passing liquid from pulp through a filtering medium submerged in a body of the pulp in a container while maintaining fluid portions of the pulp in motion, and subsequently separating the filtering medium and body of the pulp leaving the filtering medium and the material collected thereon exposed, retaining said material on the filtering medium while exposed, and recovering values from said material while on the filtering medium.

42. In a process of the class described, passing liquid from pulp through a filtering medium submerged in a body of pulp in a container while maintaining fluid portions of the pulp in motion and thus building a cake of solids on the filtering medium, separating the filtering medium with its cake from the body of pulp, and thus exposing the filtering medium and cake, maintaining the cake on the filtering medium while exposed, submerging the filtering medium and cake in a body of displacing agent, and passing displacing agent into the cake while on the filtering medium for displacing values from the cake.

43. In a process of the class described, passing liquid from pulp through a filtering medium submerged in a body of pulp in a container while maintaining fluid portions of the pulp in motion, and thus building a cake of solids on the filtering medium, separating the filtering medium and its cake from the body of pulp, submerging the filtering medium and cake in a body of dissolving fluid and maintaining the cake on the filtering medium during the interim of separation from the pulp and submerging in the dissolving fluid and passing dissolving fluid into the cake for displacing values therefrom.

44. In a process of the class described, passing liquid from pulp through a filtering medium submerged in a body of pulp in a container while maintaining fluid portions of the pulp in motion, and thus building a cake of solids on the filtering medium, separating the filtering medium and its cake from the body of pulp, submerging the filtering medium and cake in a body of water and maintaining the cake on the filtering medium during the interim of separation from the pulp and submersion in the water, and passing water into the cake for displacing values therefrom.

45. In a process of the class described, passing liquid from pulp through a filtering medium submerged in a body of pulp in a container while maintaining fluid portions of the pulp in motion, and thus building a cake of solids on the filtering medium, separating the filtering medium and its cake from the body of pulp, submerging the filtering medium and cake in a bath of dissolving fluid and maintaining the cake on the filtering medium during the interim of separation from the pulp and submersion in the bath and while in the bath, passing fluid of the bath into the cake for displacing values therefrom, separating the filtering medium and its cake from the bath and submerging the same in a body of water and maintaining the cake on the filtering medium during the interim of separation from the bath and submersion in water, and passing water into the cake for displacing values therefrom.

46. In a process of the class described, passing liquid from pulp through a filtering medium submerged in pulp in a container while maintaining fluid portions of the pulp in motion, and thus building a cake of solids on the filtering medium, and subsequently passing different kinds of displacing agents successively into the cake while on the filtering medium for displacing values from the cake.

47. In a process of the class described, passing liquid from pulp through a filtering medium submerged in pulp in a container while maintaining fluid portions of the pulp in motion, and thus building a cake of solids on the filtering medium, displacing values from said cake, and passing a reverse cleansing current through the filtering medium toward the cake for displacing the cake from the filtering medium.

In testimony whereof I affix my signature in presence of two witnesses.

GEORGE MOORE.

Witnesses:
HENRY B. KNIGHT,
ANDREW J. EWALD.